Nov. 20, 1934.  J. T. LITTLETON  1,981,560
METHOD AND APPARATUS FOR COOLING GLASS
Filed Feb. 27, 1933
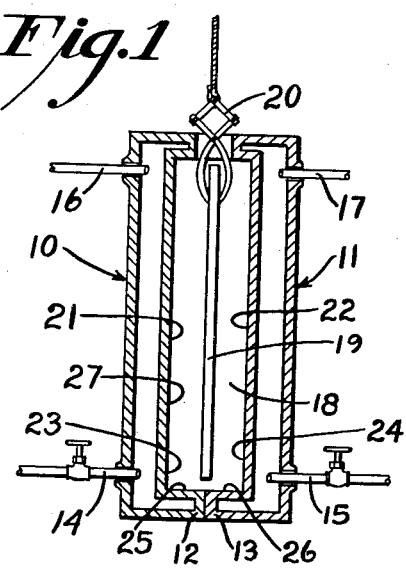
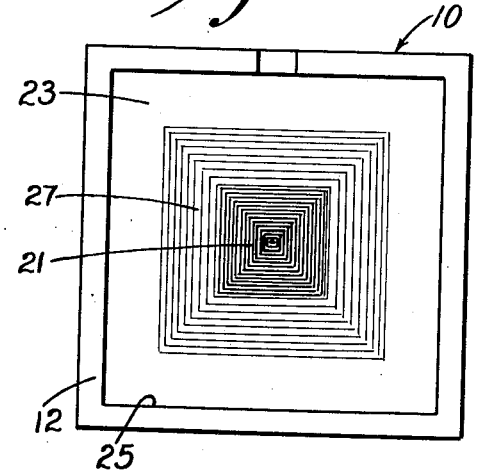
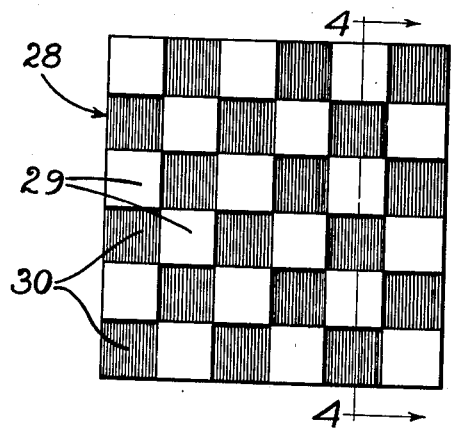
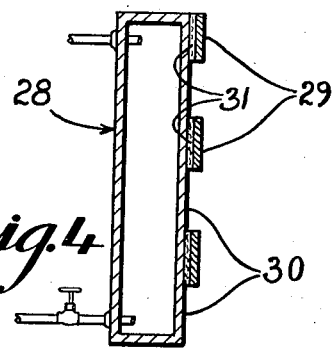
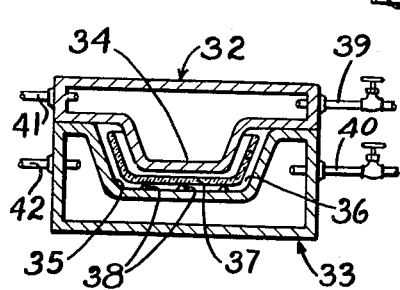
INVENTOR.
JESSE T. LITTLETON
BY Dorsey & Cole
ATTORNEYS.

Patented Nov. 20, 1934

1,981,560

UNITED STATES PATENT OFFICE 1,981,560

METHOD AND APPARATUS FOR COOLING GLASS

Jesse T. Littleton, Corning, N. Y., assignor to Corning Glass Works, Corning, N. Y., a corporation of New York Application February 27, 1933, Serial No. 658,853

2 Claims. (Cl. 49—45)

This invention relates to a method and apparatus for cooling glass and more particularly the controlling of strain in finished glass articles.

It has been proposed to cool and to strengthen glass sheets by chilling them between cooling elements, such elements comprising either heat absorbing surfaces or air jets directed on the opposite flat faces of the heated sheets. Glass articles have also been strengthened by heating them to a predetermined temperature and quenching them in a liquid medium which is heated to a lower degree. All prior methods of strengthening glass sheets or articles by chilling have aimed at the creation of compressional stresses in the surface layers of the glass and the confinement of the accompanying tensional stresses to the interior of the glass. Conversely, prior methods of annealing have aimed at the elimination of stresses or the reduction thereof to a negligible amount. In the following specification and claims I will use the term "tempering" to include both annealing and strengthening by chilling.

Prior methods and apparatus for tempering glass articles have failed to take into account the fact that at the edge or rim of the sheet or article loss of heat in cooling takes place more rapidly than it does from a point remote from the edge. This is due to the fact that at the edge of a glass article the surface area per unit volume of glass is much greater than at a point remote from the edge. The result has been failure to attain proper control of stresses near the edges of the article in the tempering operation.

It is an object of this invention to control the production and distribution of permanent stress in glass articles.

The above and other objects may be attained by practicing my invention which embodies among its features absorbing radiant heat from selected areas of the glass article and reflecting radiant heat from other areas back into those areas of the glass.

Another feature of the invention embodies absorbing in graduated amounts heat radiated from a glass article.

Other features embody a tempering element the surface of which has a varying coefficient of absorption for radiant heat.

My invention further resides in the novel construction, combination and arrangement of parts to be more fully described herein, claimed in the appended claims and illustrated in the accompanying drawing, in which:

Fig. 1 is a vertical sectional view of a device for tempering glass sheets in accordance with my invention;

Fig. 2 is a front elevation of a tempering element showing the face thereof, in accordance with my invention;

Fig. 3 is a front elevation of a modified tempering element made in accordance with my invention;

Fig. 4 is a vertical sectional view on the line 4—4 of Fig. 3;

Fig. 5 is a vertical sectional view of a device for tempering glass baking dishes in accordance with my invention;

Fig. 6 is a plan view of the face of the upper tempering element of Fig. 5; and

Fig. 7 is a plan view of the lower tempering element of Fig. 5.

Prior methods of tempering glass articles have allowed the edges thereof to cool at a faster rate than the other portions of the article. I have discovered that in the tempering of glass articles by inserting them between cooling elements the relative distance between the glass article and the faces of the cooling elements has little effect upon the rate of cooling of the glass provided convection currents in the air around the glass are eliminated or prevented. I have further discovered that under these conditions the rate of cooling of the glass depends entirely upon the coefficient of absorption of the faces of the cooling elements and the temperatures of the cooling elements and the glass surface. Hence I have found that the cooling of the edges and any other desired portions of the article may be retarded by reflecting back into those portions the heat which is lost by radiation in cooling and the cooling of other portions may be accelerated by absorbing and dissipating the heat which is lost therefrom.

For example, in Fig. 1, I have shown a device constructed in accordance with my invention for controlling the cooling rate of glass sheets. The device comprises tempering elements 10 and 11 which are formed of cast iron or other suitable heat conducting material and which have projecting flanges 12 and 13 around their edges. The tempering elements are hollow and are provided with inlets 14 and 15 and outlets 16 and 17 for the circulation of cooling fluid. The tempering elements may be hinged or slideably mounted to permit their being separated or brought together and when in the closed position as shown the flanges 12 and 13 butt together to form a chamber 18. A sheet of glass 19 which has been heated to a temperature above strain point is supported in the chamber 18 by tongs 20 or is supported by resting on small buttons or knife edges (not shown) of clay, "transite" or other suitable nonconducting material. Small lugs (not shown) of similar material may be provided in the faces of the tempering elements if desired to hold the glass sheet in spaced relation to the sides of the chamber 18.

In order to retard the cooling of the edges of the glass sheet the character of the faces of the tempering elements 10 and 11 is made to vary from the centers to the borders thereof with respect to absorption coefficient, the centers having a higher coefficient than the borders. Regions 21 and 22 of the faces of the tempering elements which are adjacent the central portion of the glass sheet are blackened or otherwise rendered heat absorbing. Portions 23 and 24 of the surfaces of the tempering elements which are adjacent the edges of the glass sheet and inner faces 25 and 26 of the flanges 12 and 13 are polished or otherwise rendered less absorbing to radiant heat. This is more clearly shown in Fig. 2 which although it illustrates the face of the element 10 is also illustrative of the face of the element 11. In an area 27 between the regions 21 and 23 the absorbing property of the surface varies progressively from the relatively high value of region 21 to the relatively low value of region 23. The reflecting surfaces may comprise a chromium plate or other suitably resistant surface of variable degree of polish. The absorbing surfaces may consist of a coating of lamp black or graphite of variable degree of density.

By maintaining the proper ratio between the amount of heat reflected back into the edges of a glass sheet and the amount of heat absorbed and carried away from the central portion thereof, the entire sheet can be cooled in a uniform manner. Therefore, the formation of excess stresses which ordinarily occur in the edge of the sheet is prevented. Since the cooling rate may readily be increased or diminished by a corresponding change in the rate of flow or the temperature or both of the fluid cooling medium, it follows that the degree of annealing or the amount of residual uniform stress can likewise be controlled. Since the relation between the amount of absorption and reflection, or, in other words, the difference between the absorption properties of the different areas of the face of the tempering element will vary with conditions such as the thickness of the glass sheet and the expansion coefficient and other physical properties depending upon the composition of the glass, it is obvious that the variation necessary for the proper tempering of all sheets of glass can not be stated. However, these relations for any particular set of conditions can readily be determined by trial.

If it is desired to produce in an article a predetermined non-uniform strain pattern by forming a corresponding pattern of compressional stresses in the surface of the article the reflecting and absorbing portions of the tempering element can easily be arranged in the proper sequence and with the proper difference in absorption coefficients to obtain this result. It may also be desirable to have the strained areas of the glass more or less sharply outlined in order to intensify those properties which are associated with stress. Such a distribution of stress may be obtained by varying more or less abruptly the coefficient of absorption of the various regions of the surface of the tempering elements from relatively high absorption to relatively low absorption and in addition by insulating the less absorbing regions from the face of the tempering element.

In Figs. 3 and 4 I have shown a tempering element 28 the face of which bears an arbitrary design composed of reflecting areas 29 and absorbing areas 30. It is to be understood that the design shown is purely arbitrary for the purpose of illustration and that this design may take any desired form. To obtain the sharpest demarcation between areas 29 and 30 the areas 29 are insulated from the face of the tempering element 28 by the insertion thereunder of layers of insulation 31 which may be composed of asbestos, transite or other suitable insulating material.

The method above described for the tempering of glass sheets is likewise applicable to other glass articles such as baking dishes and the like and such articles can thereby be annealed so as to be free from the usual rim strain or they can be made to acquire a uniform or non-uniform compressional stress over the entire surface as desired in order to increase the mechanical and thermal strength or to give them definite breaking characteristics as the case may be.

In Fig. 5 an upper tempering element 32 rests upon a lower tempering element 33 in such a manner that a truncated conical extension 34 of the element 32 projects into a corresponding cavity 35 of the element 33 to form a dish-shaped chamber 36. Within the chamber 36 a glass baking dish 37 rests upon pointed supports 38 of non-conducting material such as "transite", fire clay or the like, so that the dish 37 is not in contact with the walls of the chamber 36. The tempering elements 32 and 33 are hollow and are provided with inlets 39 and 40 and outlets 41 and 42 for the circulation of cooling fluid. The elements 32 and 33 may be hinged or mounted in any suitable manner (not shown) to facilitate their being separated or brought into closed relation. As in the case of the tempering elements shown in Figs. 2 and 3 the faces of the tempering elements 32 and 33 have a varying coefficient of absorption. In order to properly temper the dish 37 it will be obvious in view of the foregoing that those portions of the faces of the tempering elements 32 and 33 which are adjacent the rim of the dish 37 must have a lower coefficient of absorption than the portions which are remote from the rim and that the remote portions must have a relatively higher coefficient of absorption (illustrated by the shaded areas of Figs. 6 and 7). As pointed out above the difference in coefficient of absorption necessary for the proper tempering of all glass articles can not be stated since this will vary with conditions but it may readily be determined by trial.

While in the foregoing there has been shown the preferred embodiment of my invention it is to be understood that minor changes in the details of construction, combination and arrangement of parts may be resorted to without departing from the spirit and scope of my invention as claimed.

I claim:

1. An apparatus for tempering glass articles which includes a tempering element the surface of which is blackened in selected areas and polished in other areas, the degree of blackness of the blackened areas decreasing toward adjacent polished areas.

2. The method of tempering glass which includes absorbing radiant heat from selected areas of the glass and reflecting radiant heat back into the other areas of the glass and graduating the degree of absorption between the different areas.

JESSE T. LITTLETON.